(12) United States Patent
Topper

(10) Patent No.: US 6,473,460 B1
(45) Date of Patent: Oct. 29, 2002

(54) METHOD AND APPARATUS FOR CALCULATING MOTION VECTORS

(75) Inventor: Robert J. Topper, Hatboro, PA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/540,934

(22) Filed: Mar. 31, 2000

(51) Int. Cl.⁷ .................................................. H04B 1/66
(52) U.S. Cl. .................................................. 375/240.16
(58) Field of Search ........................ 375/240, 240.01, 375/240.02, 240.03, 240.12, 240.13, 240.14, 240.15, 240.16, 240.17, 240.19, 240.26; 348/390, 400, 409.1, 415.1, 416.1, 699, 700; 382/232, 234, 236; H04B 1/66

(56) References Cited

U.S. PATENT DOCUMENTS

| | | | |
|---|---|---|---|
| 5,198,901 A | | 3/1993 | Lynch |
| 5,581,302 A | * | 12/1996 | Ran et al. ................. 348/416.1 |
| 5,635,994 A | * | 6/1997 | Drexler et al. .............. 348/699 |
| 5,764,805 A | * | 6/1998 | Martucci et al. ............ 382/238 |
| 6,195,389 B1 | * | 2/2001 | Rodriguez et al. ..... 375/240.16 |
| 6,335,950 B1 | * | 1/2002 | Kohn ..................... 375/240.16 |
| 6,359,929 B1 | * | 3/2002 | Boon ..................... 375/240.16 |

OTHER PUBLICATIONS

S. Kwon, K. Seo, J. Kim, Y. Kim, "A Motion–Adaptive De–Interlacing Method", IEEE Transactions on Consumer Electronic, vol. 38, No. 3, Aug. 1992, pp. 145–150.

Sugiyama and Nakamura, "A Method of De–Interlacing with Motion Compensated Interpolation," IEEE Transactions on Consumer Electronic, vol. 45, No. 3, Aug. 1999, pp. 611–616.

Netravali, et al., "A Codec for HDTV," IEEE Transactions on Consumer Electronic, vol. 38, No. 3, Aug. 1992, pp. 325–340.

Eric Chan and Sethuraman Panchanathan, "Motion Estimation Architecture for Video Compression," IEEE Transactions on Consumer Electronic, vol. 39, No. 3, Aug. 1993, pp. 292–297.

* cited by examiner

*Primary Examiner*—Chris Kelley
*Assistant Examiner*—Tung Vo
(74) *Attorney, Agent, or Firm*—RatnerPrestia

(57) ABSTRACT

A motion estimation system for finding motion vectors between first and second images selects first and second overlapping blocks of pixels from the first image. The motion estimation system then estimates motion between the first and second images to define respective motion vectors for the overlapping blocks. These motion vectors are assigned to respective first and second non-overlapping sub-blocks of pixels within the respective first and second overlapping blocks of pixels. The motion estimation system is advantageously used in a video de-interlacing system in which the sub-blocks are used to determine whether interpolated samples are generated using samples from both the first and second image fields or only from the first field.

14 Claims, 6 Drawing Sheets

METHOD AND APPARATUS FOR CALCULATING MOTION VECTORS

BACKGROUND OF THE INVENTION

The present invention relates to a method and apparatus for calculating motion vectors and, in particular, to a motion vector calculation suitable for use in a video de-interlacing system.

Digital television (DTV) signals conforming, for example, to the Advanced Television Systems Committee (ATSC) standard, may have a large number of formats. These formats are typically referenced by the number of horizontal lines in the image and whether each image frame is formed from two fields, each containing alternate lines of the frame (interlaced) or from a single image field containing all of the lines of the frame (progressive). Listed from highest resolution to lowest resolution, the television signal formats defined by the ATSC standard are referenced by the designations, 1080I, 720P, 480P and 480I. In these designations, the number refers to the number of horizontal lines in the image and the letter defines the resulting image as being interlaced (I) or progressive (P).

Television receivers that operate according to the standard set by the National Television Standards Committee (NTSC) display 480 lines of active video information as two interlaced fields and, so, have a resolution of 480I. Most of the existing programming in the United States conforms to the NTSC standard.

ATSC television receivers may support many different types of monitors. An ATSC receiver may, for example, be connected to a multi-sync monitor that can adapt to display whatever signal type is being received. This type of multi-sync monitor is typically referred to as a native mode monitor as it allows each possible type of ATSC signal to be displayed at its intended resolution. Alternatively, ATSC receivers may be purchased that can be connected to a standard NTSC monitor. One such receiver is the TU-DST51 DTV Decoder Set-Top Box manufactured by Panasonic. This receiver converts each ATSC signal type into a 480I output signal that may be displayed on the NTSC monitor. The Panasonic receiver also supports the other types of monitors, automatically converting the received input signal to the format that is supported by the specified monitor.

It is well known that interlaced video signals have artifacts caused by the interlacing of video fields that occur at two different instants. One such artifact is vertical dot crawl. This artifact occurs at vertical edges in the image, typically at edges between portions of the image having different colors. As the name implies, the vertical dot crawl artifact is seen as a line of dots that seem to move from the bottom to the top of the frame. If the display device supports progressive video signals, these artifacts of interlaced scanning may be removed, or at least mitigated, by converting the interlaced video signal to a progressive video signal before it is displayed.

There are many methods for converting an interlaced video signal to a progressive video signal. Some of these methods are described in a paper by K. Sugiyama et al. entitled "A Method of De-interlacing with Motion Compensated Interpolation," *IEEE Transactions on Consumer Electronics,* Vol. 45, No. 3, 1999 pp. 611–616. Typically an interlaced video signal is converted to a progressive video signal (i.e. de-interlaced) by inserting interpolated image lines between the existing lines in each image field of the video signal.

In motion compensated de-interlacing systems, a trade off exists between noise performance and small object Tracking. Motion compensation systems that use relatively large block sizes typically have good noise performance, that is to say they do not tend to track noise in the image instead of the underlying image content. These systems, however, do not tend to track small objects well. Thus, if a small object moves in the image sequence from one image to the next, a de-interlacing system that uses a large block size may have difficulty matching the moved object to the same object in the current frame. If, on the other hand, the block size is reduced as in the above referenced article, the small object recognition is improved but the noise performance suffers.

SUMMARY OF THE INVENTION

The present invention is embodied in a motion estimation system for finding motion vectors between first and second images. The motion estimation system selects first and second overlapping blocks of pixels from the first image. The motion estimation system then estimates motion between the first and second images to define respective motion vectors for the overlapping blocks. These motion vectors are assigned to respective first and second non-overlapping sub-blocks of pixels within the respective first and second overlapping blocks of pixels.

DETAILED DESCRIPTION

Figure 1A:
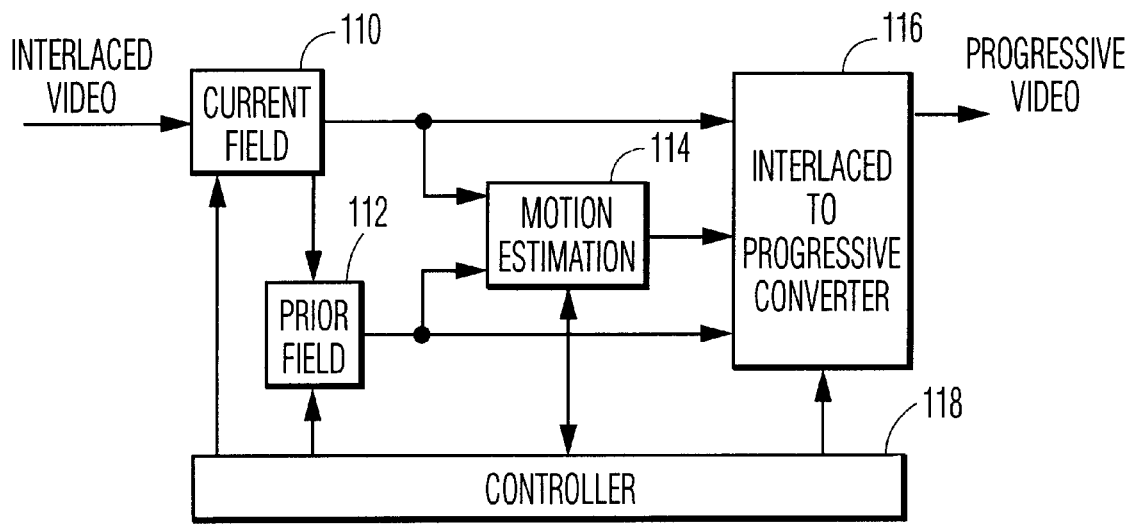
FIG. 1A is a block diagram of a motion adaptive interlaced scan to progressive scan conversion system in accordance with the present invention.

FIG. 1 is a block diagram of an exemplary interlaced to progressive scan conversion system according to the present invention. In FIG. 1A, an interlaced video signal is received into a current field memory 110. As each new field is received, the prior contents of the memory 110 are transferred into a prior field memory 112. A motion estimation processor 114 is coupled to receive video information from both the current field memory 110 and the prior field memory 112. The motion estimation processor 114, as described below, generates motion vectors for the current field based on eight-by-eight blocks of pixels. The motion vectors, however, are applied to four-by-four blocks of pixels. These motion vectors are used by the interlaced to progressive converter 116 to generate vertically interpolated samples between each pair of samples of the interlaced video signal. The current field memory 110, prior field memory 112, motion estimation processor 114, and interlaced to progressive converter 116 are controlled by a controller 118.

Although the subject invention is described in terms of an exemplary embodiment that generates interpolated samples for a current field by examining samples from a prior field, it is contemplated that it may be practiced in the context of a current field that generates interpolated samples by examining samples from a next field or from both a next field and a prior field.

Figure 1B:
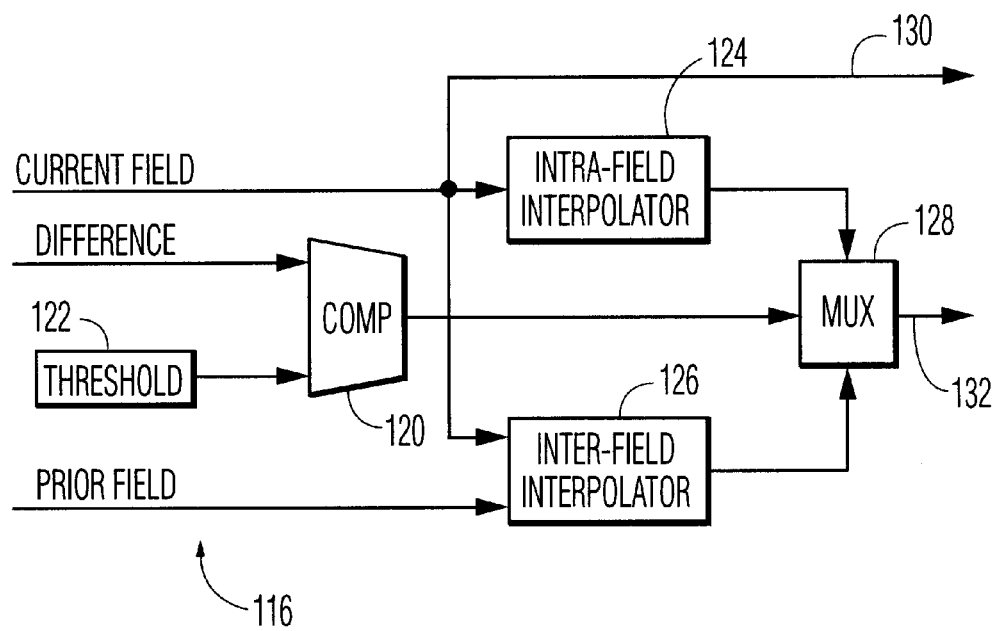
FIG. 1B is a block diagram of an interlaced to progressive converter suitable for use in the conversion system shown in FIG. 1A.

The interlaced to progressive converter 116 is shown in FIG. 1B. This converter includes an intra-field interpolator 124 and an inter-field interpolator 126. The intra-field interpolator 124 vertically averages corresponding samples from adjacent lines in the current interlaced field to generate interstitial samples between the lines. The inter-field interpolator 126 filters lines of samples from the current field and from the prior field, as indicated by the motion vector, to produce interpolated samples that are compensated for motion in the image. When the motion vector generated by the motion estimation circuitry 114 truly reflects motion between the current field and the prior field, the interpolated lines generated by the interpolator 126 are preferred as the resultant image has greater vertical resolution than if the lines from the intra-field interpolator 124 are used. If, however, the motion vectors generated by the motion estimation processor are not reflective of true motion between fields, the interpolated samples generated by the inter-field interpolator 126 may include motion distortion that degrades the quality of the image. In this instance, it may be desirable to use the interpolated lines generated by the intra-field interpolator 124.

In the exemplary embodiment of the invention, motion estimation processor 114, shown in FIG. 1A, applies a difference value to a comparator 120. This value is a measure of the difference between the block in the current field and the corresponding block in the prior field. The comparator 120 compares the difference measure to a threshold value provided by a source of digital value (e.g. a register) 122. The output signal of comparator 120 is supplied to the control input terminal of a multiplexer 128 which is coupled to receive the intra-field interpolated samples provided by interpolator 124 at one signal input port and the corresponding samples provided by the inter-field interpolator 126 at a second signal input port. If the difference value provided by the motion estimation processor 114 is greater than the threshold, the comparator causes the multiplexer 128 to provide intra-field interpolated samples as the interpolated output signal 132. If, on the other hand, the difference value provided by the processor 114 is less than threshold value 122, the comparator causes the multiplexer 128 to provide inter-field interpolated samples generated by interpolator 126 as the interpolated output signal 132. The interlaced signal of the current field is provided as the interlaced samples 130. Together, the samples provided by the signal lines 130 and 132 form the progressive video image.

Figure 2A:
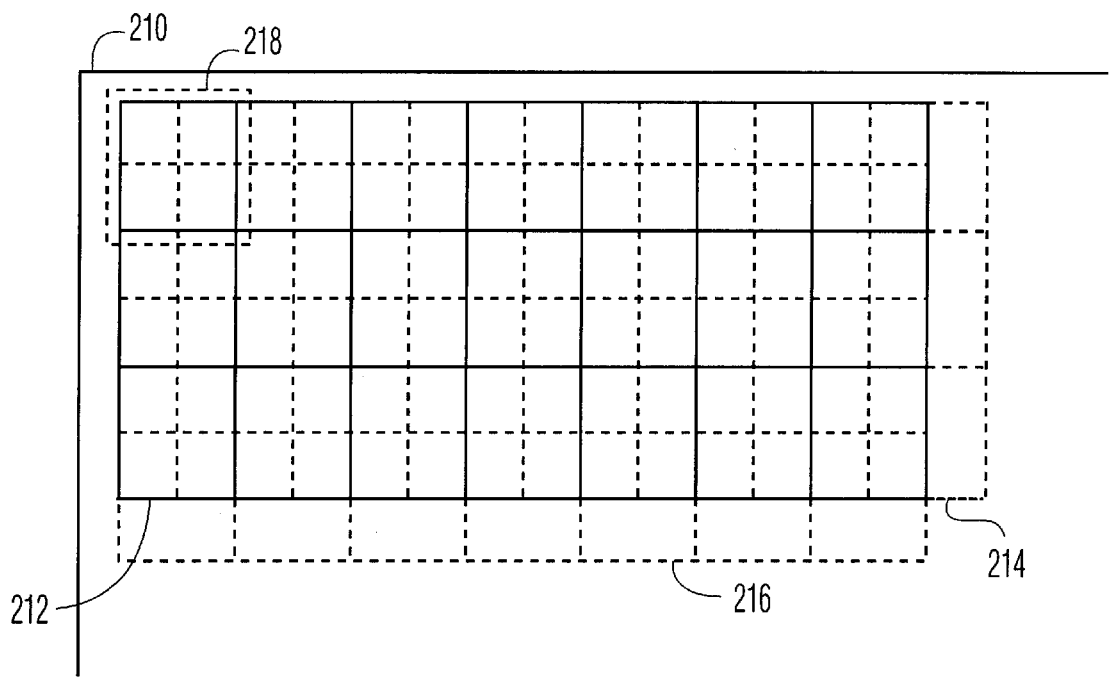
FIG. 2A is an image diagram that is useful for describing the block selection scheme used for motion vector calculation by the motion estimation processor shown in FIG. 1A.

FIG. 2A is an image diagram that illustrates the overlapping large blocks used by the motion estimation processor 114 to calculate motion vectors. FIG. 2A shows an image 210 and three sets of overlapping large blocks defined for the image. These sets of blocks are represented, respectively, by solid lines, dashed lines, and dotted lines. The first set of blocks 212 are defined by the solid lines. These blocks are offset from the edge of image 210 by, for example, two pixels in both the horizontal and vertical directions. Each exemplary block 218, as outlined by the lines having alternating dashes and dots, includes eight pixels on a side for a total of 64 pixels per large block. The second set of blocks 214, represented by the dashed lines, is also composed of eight-by-eight blocks of pixels. These blocks, however, are offset in the horizontal direction by six pixels from the left side edge of the image 210 and by two pixels from the top edge. The third set of eight-by-eight blocks of pixels, represented by the dotted lines, is the set 216 which is offset from the left side edge of the image 210 by two pixels and from the top edge of the image by six pixels.

Figure 2B:
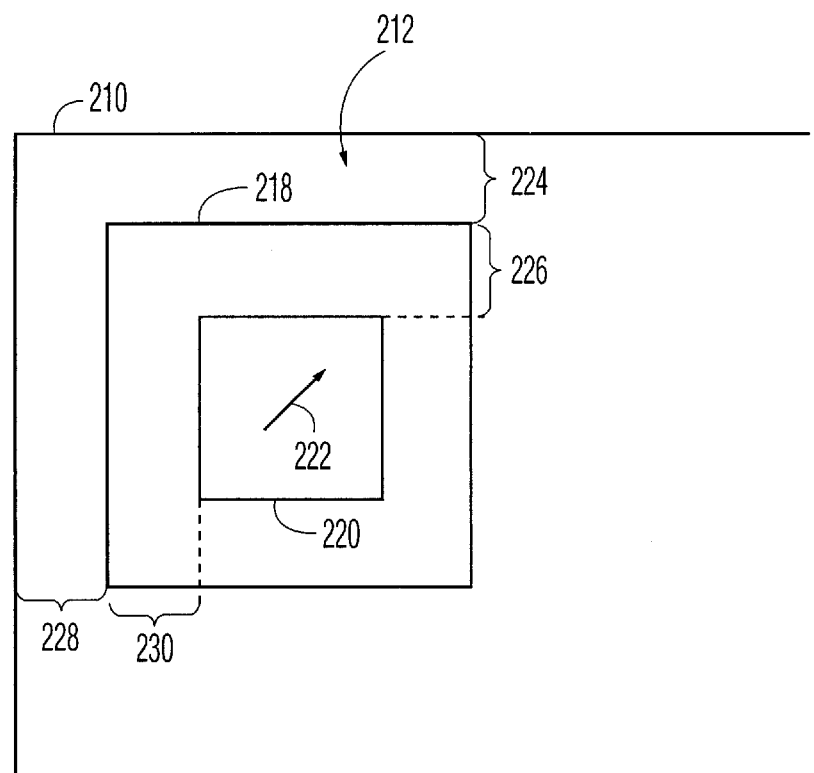
FIG. 2B is an image diagram showing a portion of the image diagram shown in FIG. 2A.

FIG. 2B shows a detailed portion of the image shown in FIG. 2A including the eight-by-eight block of pixels 218. As shown in FIG. 2B, the block of pixels 218 is offset from the left side edge of the image 210 by a two pixel interval 228. This block is also offset from the top side of the image by a two-pixel interval 224.

The exemplary embodiment of the invention uses conventional motion estimation techniques to define a motion vector 212 based on the eight-by-eight block of pixels 218. This motion vector, however, is applied only to a central four-by-four subblock of pixels 220. As shown in FIG. 2B, this central block is offset from the top edge of the block 218 by a two pixel interval 226 and from the left side edge of the block 218 by a two pixel interval 230.

FIG. 2B, represents a first step in the motion estimation process performed by the processor 114 shown in FIG. 1A. By this process, the motion estimation processor first defines the block 218 and then calculates a motion vector for the block by comparing the block 218 to corresponding eight-by-eight blocks of pixels from the prior field 112 that are displaced in position over a range of pixel positions (e.g. by plus or minus one to six pixel positions in each of the horizontal and vertical directions). The motion vector corresponds to the displacement of the block of the prior image that is within the search range and that best satisfies a matching criterion with respect to the block 218 in the current image 210. Exemplary matching algorithms may calculate, for example, the mean absolute difference between the 64 corresponding pairs of pixels in the block. Once the motion vector is calculated, however, it is assigned only to the central four pixel by four pixel sub-block 220.

Figure 3A:
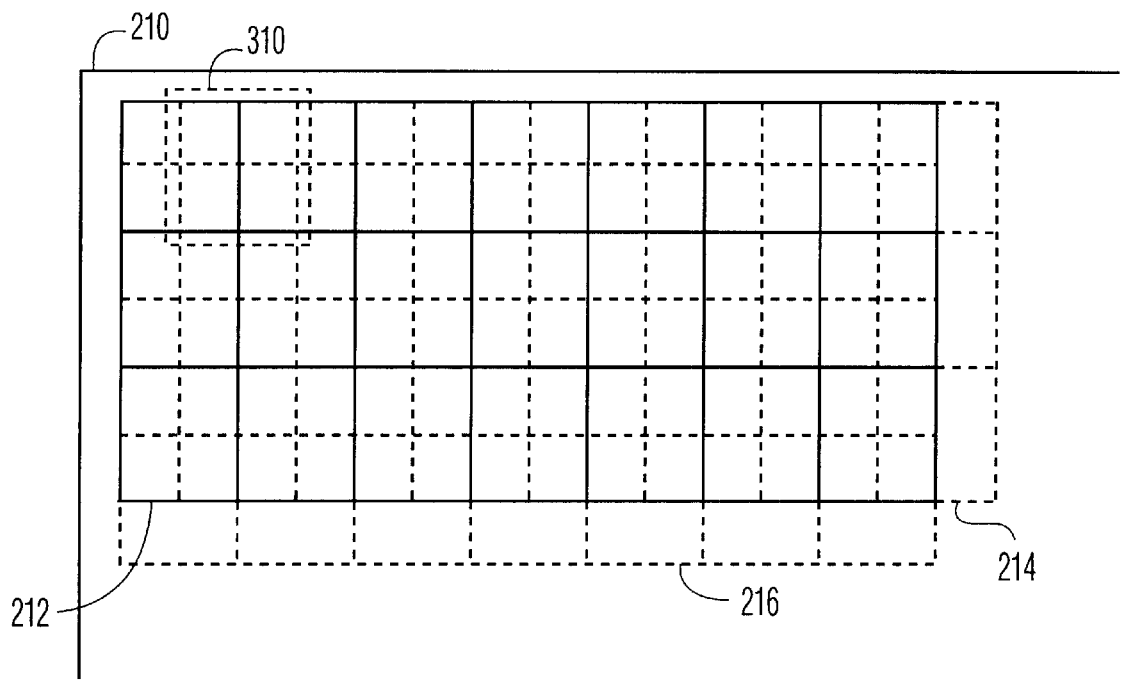
FIG. 3A is an image diagram which is useful for describing the motion vector calculation procedure used by the motion estimation processor shown in FIG. 1A.
Figure 3B:
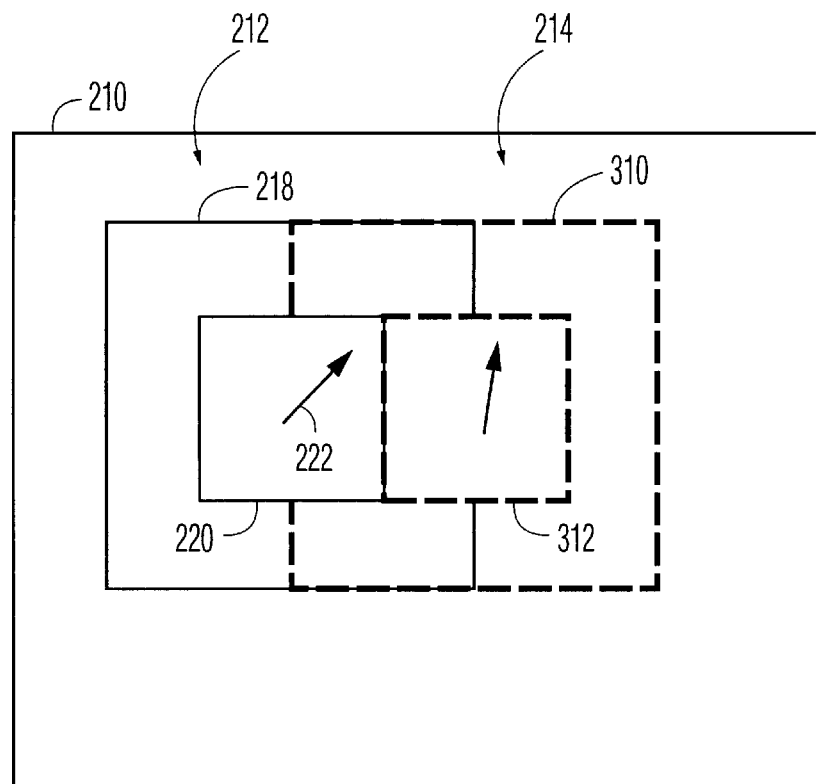
FIG. 3B is an image diagram that shows a portion of the image diagram of FIG. 3A.

FIGS. 3A and 3B illustrate a second step in the motion estimation process performed by the processor 114. In this step, a second eight-by-eight block of pixels, 310, is used to generate a motion vector. This block of pixels is from the group of horizontally displaced blocks of pixels 214. As shown in FIGS. 3A and 3B, the block of pixels 310 overlaps the block of pixel 218 by four pixels in the horizontal direction. As with the block of pixel 218, the motion estimation processor 114 generates a motion vector 314 for the entire eight-by-eight block of pixels 310 but applies this motion vector only to the central four by four pixel sub-block 312. This block is displaced by two pixels positions in each direction from the edges of the block of pixels 310. Thus, the small block 312 is immediately adjacent to the small block of pixels 220.

Figure 4A:
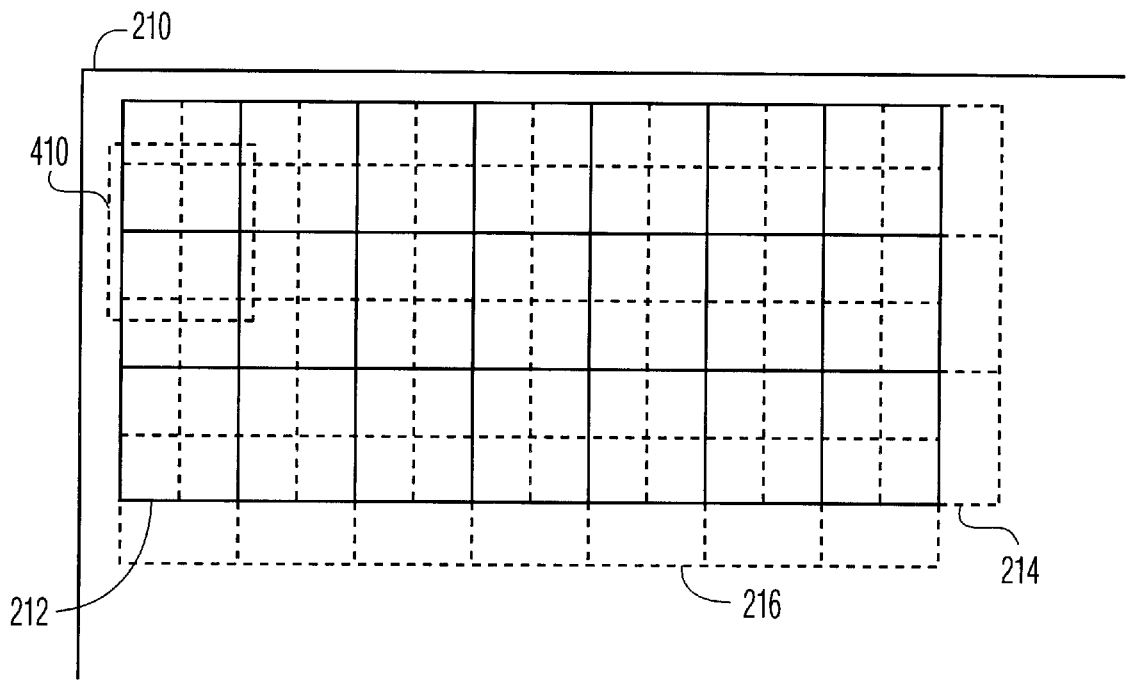
FIG. 4A is an image diagram which is useful for describing the motion vector calculation process used by the motion estimation processor of FIG. 1A.
Figure 4B:
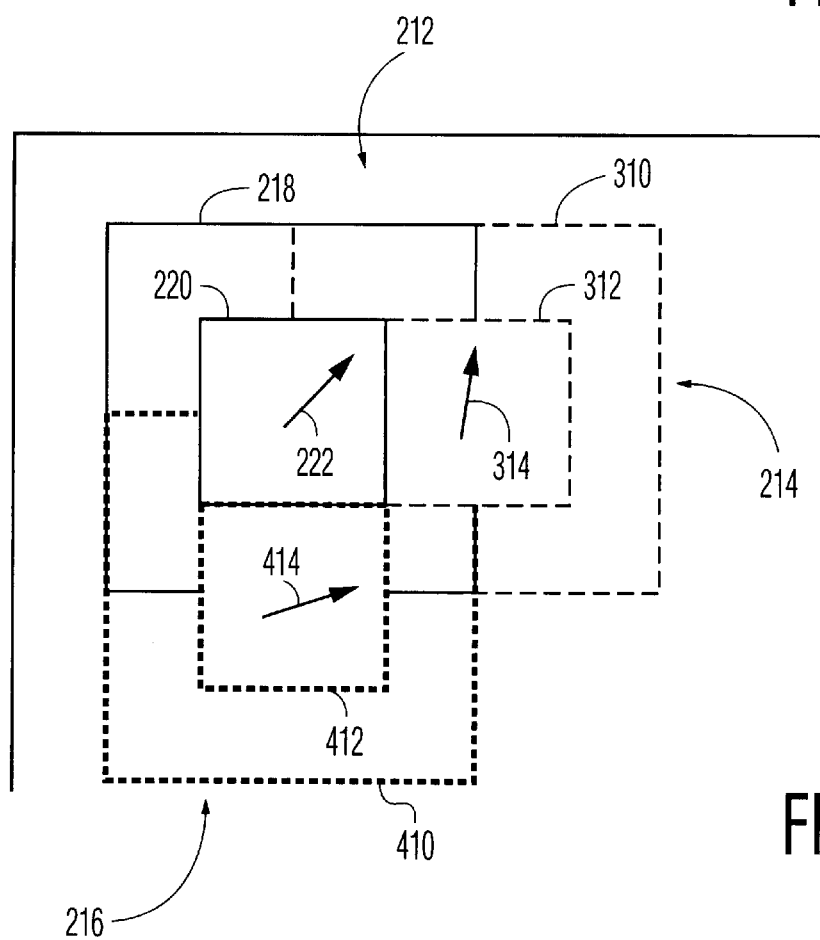
FIG. 4B is an image diagram showing a portion of the image diagram of FIG. 4A.

The steps shown in FIGS. 2A and 2B; and 3A and 3B are repeated across the entire width of the current image field 210. FIGS. 4A and 4B illustrate steps that are performed by the motion estimation processor 114 after the last block along the width of the image 210 has been processed using the steps illustrated by FIGS. 2 and 3. In the step shown by the FIGS. 4A and 4B, the motion estimation process 114 takes a block of samples 410 that is displaced by four-pixel positions in the vertical direction from the top edge of the block of samples 218 and, thus, overlaps the lower four lines of samples in the block. The motion estimation processor 114 calculates a motion vector 414 for the entire eight-by-eight block of pixels 410, but applies this motion vector only to the four-by-four central sub-block 412 of the eight-by-eight block of pixels 410. The four by four sub-block of pixels 412 is immediately below the four by four sub-block 220.

The motion estimation process continues using a eight-by-eight block of pixels (not shown) that is displaced by four pixel positions in both the horizontal and vertical directions from the edges of the blocks of pixels 218. This block of pixels, thus, overlaps the lower one-quarter of the block 218 and is used to generate a motion vector for a four-by-four block of pixels that is immediately below the four-by-four sub-block 312 and immediately to the right of the four-by-four sub-block of pixels 412. This process continues across the width of the image 210. After the last block of pixels in this second row of pixel blocks has been processed, the motion estimation process continues by using the next lower block of pixels from the group of pixels 212 outlined by solid lines in FIGS. 2A, 3A, and 4A.

The result of the process illustrated by FIG. 2A through 4B is a set of four-by-four blocks of pixels each of which has an associated motion vector. The motion vector, however, is computed from a larger eight-by-eight block of pixels and so exhibits superior noise performance. When the motion estimation processor 114 applies the four-by-four blocks of pixels to the interlaced to progressive converter 114, It also provides a measure of difference between the four-by-four block of pixels from the current field and the matching four-by-four block of pixels from the prior field. This measure of difference, may for example, be a mean absolute difference (MAD) of pixel values or a means squared error (MSE) of the pixel values at corresponding positions in the two blocks.

Because the motion estimator 114 tracks motion in the image based on eight-by-eight blocks of pixel values, it tends to track image content and not noise. Thus, the estimator 114 exhibits superior noise performance compared to a converter that uses a smaller block size. In addition, because the measure of difference between the matching blocks that is applied to the interlaced to progressive converter 116 is based on the small, four-by-four pixel sub-blocks, the converter 116 is better able to reject false matches of small objects in the image than if a larger block size were used. Thus the interlaced to progressive converter 116 exhibits both good noise performance and good small object tracking.

Figure 5:
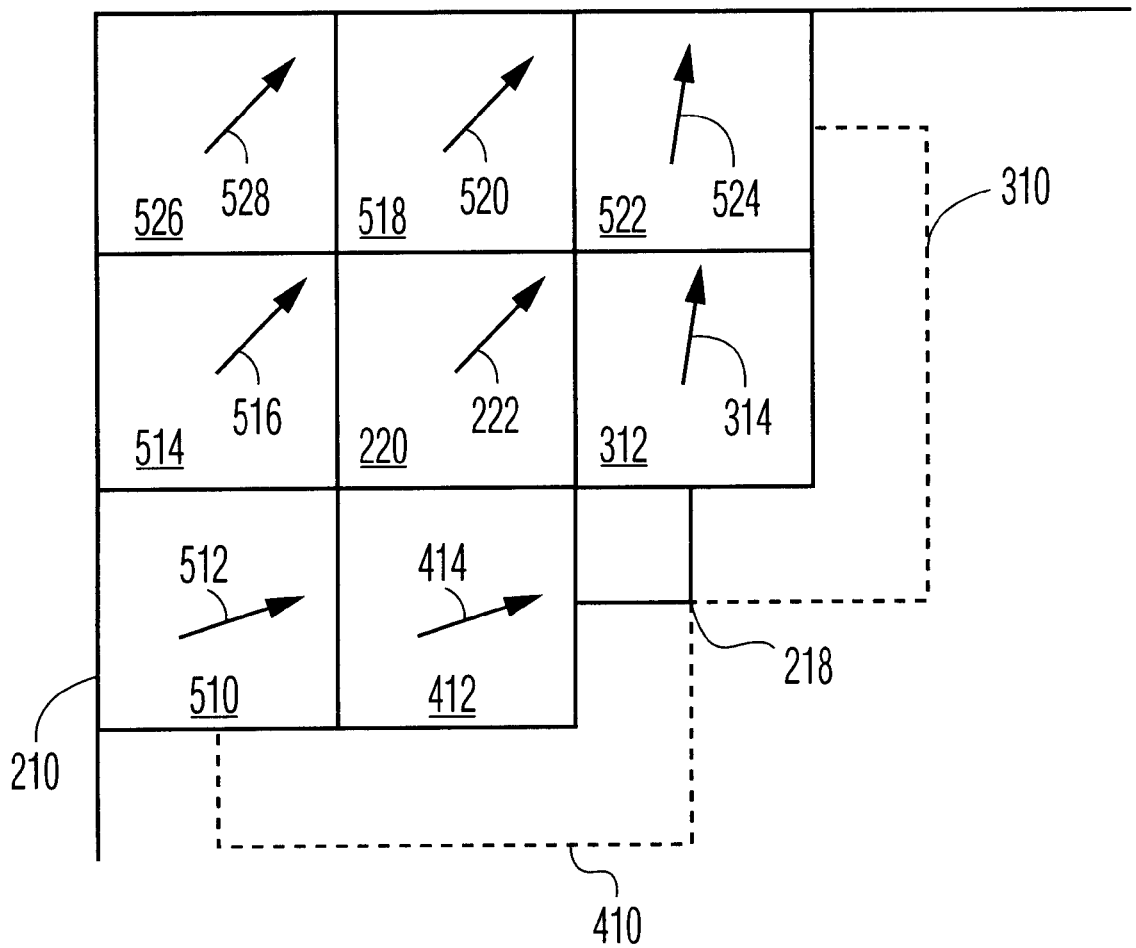
FIG. 5 is an image diagram which illustrates an exemplary process for calculating motion vectors of blocks around the edge of any of the images shown in FIGS. 2A through 4B.

At the end of the motion estimation process, when the last eight-by-eight block of pixels in the image has been processed, motion vectors exist for all of the blocks of pixels in the image except for a line of four pixel by four pixel sub-blocks, that surround the image. Motion vectors for these sub-blocks of may be calculated in many ways. One example is shown in FIG. 5. In this Figure, the four-by-four sub-block of pixels 510 does not have a motion vector defined by the process described above. In this exemplary embodiment of the invention, the motion vector 414 calculated for subblock 412 is copied as the motion vector 512 for the four-by-four sub-block 510. Similarly the motion vector 222 of sub-block 220 is copied as the motion vector 516 of sub-block 514; the motion vector 222 is also copied as the motion vector 520 of subblock 518 and the motion vector 314 of sub-block 312 is copied as the motion vector 524 of sub-block 522. Block 526 does not have a calculated motion vector immediately adjacent along one of its edges. In this exemplary embodiment of the invention, however, the motion vector 222 is copied as the motion vector 528 for sub-block 526.

Because the sub-blocks 510, 514, 518, 522, and 526 lie along the edge of the image 210, they are less important than blocks more centrally located in the image. This is because the viewers attention is typically directed to the center of the image and not to the edges of the image. Accordingly, the calculation of the motion vectors for these blocks is less important than for blocks near the central portion of the image. In an alternative embodiment of the invention, the motion vectors for these blocks may be set to zero. Alternatively, some other function of the adjacent blocks may be calculated, for example, the motion vector for block 512 maybe calculated as an average of the motion vectors 222, 414, and a motion vector (not shown) for the four-by-four sub-block of pixels (not shown) immediately below sub-block 412.

Although the exemplary embodiments of the invention shown in FIGS. 2A through 5 define a row of small blocks around the edge of the image that have motion vectors generated by means other than the subject invention, it is contemplated that this step may be omitted. If, for example, the interlaced image is larger than the equivalent progressive image, the set of blocks 212 may be aligned with the top and left edges of the image, the set of blocks 214 may be aligned with the top and right edges of the image and the set of blocks 216 may be aligned with the bottom and left edges of the image. In this implementation, a border region of, for example, two pixels is defined around the image. If this border region may be ignored in the progressive image, then no special motion vector step, as shown in FIG. 5, need be implemented.

The embodiments of the invention described with reference to FIGS. 1A and 1B contemplate the use of specific hardware circuits to implement the subject invention. It is contemplated, however, that the invention may be implemented in software for a general purpose or special purpose computer. The software may reside on a computer readable carrier such as a magnetic or optical disk or a radio frequency or audio frequency carrier wave.

Figure 6:
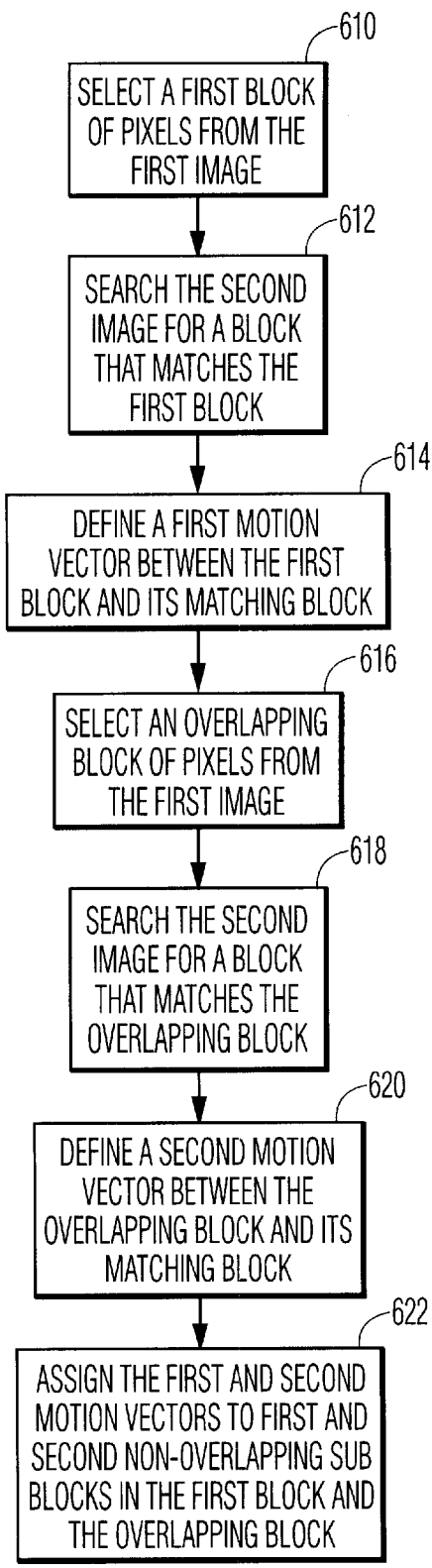
FIG. 6 is a flow-chart diagram that is useful for describing the process of the subject invention.

FIG. 6 is a flow-chart diagram that illustrates an exemplary software implementation of the invention that defines two motion vectors for respective overlapping blocks. These motion vectors define motion between the overlapping blocks in a first image and corresponding overlapping blocks in a second image. At step 610, the process selects a first block of pixels from the first image. At step 612, the process searches a predetermined range in the second image for the best matching block. At step 614, the displacement of the matching block relative to the first block is set as a motion vector for the first block.

Next, at steps 616, 618 and 620, the above process is repeated for the second overlapping block to define a second motion vector. The final step in the process, step 622 assigns the first and second motion vectors to respective first and second non-overlapping blocks taken from central locations in the first and second overlapping blocks.

While the invention has been described in terms of an exemplary embodiment, it is contemplated that it may be practiced as described above within the scope of the attached claims. For example, while the large blocks of pixels in the exemplary embodiment of the invention are eight-by-eight pixel blocks and the small blocks are four-by-four pixel blocks, it is contemplated that other block sizes may be used. In addition, it is contemplated that other amounts of overlap may be used. The large blocks may be, for example, eight pixel by ten pixel blocks and the small blocks may be four pixel by six pixel blocks. In addition, while the invention has been described in terms of a de-interlacing system, it is contemplated that it may be used in other systems that employ motion vectors such as image compression systems and machine vision systems.

What is claimed:

1. A method for calculating motion vectors between a first image and a second image, each of the first and second images having successive lines of picture element (pixel) samples, comprising the steps of:
   selecting a first block of N by M pixels having a predetermined position in the first image, where N and M are both integers greater than two;
   identifying a first matching block of N by M pixels in the second image, the first matching block having a position that is displaced from the position of the first block in the first image within a predetermined range of displacements and that matches the first block according to a predetermined criterion;
   calculating a first motion vector as the displacement of the pixel position of the first matching block of pixels from the second image relative to the position of the first block in the first image;
   selecting a second block of N by M pixels from the first image, the second block overlapping the first block in at least O pixel positions, O being an integer less than N times M;
   identifying a second matching block of N by M pixels in the second image, the second matching block having a position that is displaced from the position of the second block in the first image within the predetermined range of displacements and that matches the second block according to the predetermined criterion; and
   calculating a second motion vector as the displacement of the pixel position of the second matching block of pixels in the second image relative to the position of the second block in the first image.

2. A method according to claim 1, further including the step of assigning the first and second motion vectors to respective non-overlapping blocks of n by m pixels in the respective first and second blocks of the first image, where n and m are integers, n being less than N and m being less than M.

3. A method according to claim 2, wherein N and M both equal eight, and n and m both equal four.

4. A method according to claim 1, wherein the second block in the first image is horizontally displaced from the first block in the first image.

5. A method according to claim 4, further including the steps of:
   selecting a third block of N by M pixels from the first image, the third block being vertically displaced from the first block and overlapping the first block in at least O pixel positions;
   identifying a third matching block of N by M pixels in the second image, the third matching block having a position that is displaced from the position of the third block in the first image within the predetermined range of displacements and that matches the third block according to the predetermined criterion; and
   calculating a third motion vector as the displacement of the pixel position of the third matching block of pixels from the second image relative to the position of the third block in the first image.

6. A method according to claim 1, wherein the second block in the first image is vertically displaced from the first block in the first image.

7. Apparatus for calculating motion vectors between a first image and a second image, each of the first and second images having successive lines of picture element (pixel) samples, the apparatus comprising:
   means for selecting a first block of N by M pixels having a predetermined position in the first image, where N and M are both integers greater than two;
   means for identifying a first matching block of N by M pixels in the second image, the first matching block having a position that is displaced from the position of the first block in the first image within a predetermined range of displacements and that matches the first block according to a predetermined criterion;
   means for calculating a first motion vector as the displacement of the pixel position of the first matching block of pixels from the second image relative to the position of the first block in the first image;
   means for selecting a second block of N by M pixels from the first image, the second block overlapping the first block in at least O pixel positions, O being an integer less than N times M;
   means for identifying a second matching block of N by M pixels in the second image, the second matching block having a position that is displaced from the position of the second block in the first image within the predetermined range of displacements and that matches the second block according to the predetermined criterion; and
   means for calculating a second motion vector as the displacement of the pixel position of the second matching block of pixels from the second image relative to the position of the second block in the first image.

8. Apparatus according to claim 7, further including means for assigning the first and second motion vectors to respective non-overlapping blocks of n by m pixels in the respective first and second blocks of the first image, where n and m are integers, n being less than N and m being less than M.

9. Apparatus according to claim 8, wherein N and M both equal eight, and n and m both equal four.

10. Apparatus according to claim 7, wherein the second block in the first image is horizontally displaced from the first block in the first image.

11. Apparatus according to claim 10, further including:
    means for selecting a third block of N by M pixels from the first image, the third block being vertically displaced from the first block and overlapping the first block in at least O pixel positions;
    means for identifying a third matching block of N by M pixels in the second image, the third matching block having a position that is displaced from the position of the third block in the first image within the predetermined range of displacements and that matches the third block according to the predetermined criterion; and
    means for calculating a third motion vector as the displacement of the pixel position of the third matching block of pixels in the second image relative to the position of the third block in the first image.

12. Apparatus according to claim 7, wherein the second block in the first image is vertically displaced from the first block in the first image.

13. A computer readable carrier including a computer program that controls a computer to calculate motion vectors between a first image and a second image, each of the first and second images having successive lines of picture element (pixel) samples, the method comprising the steps of:

selecting a first block of N by M pixels having a predetermined position in the first image, where N and M are both integers greater than two;

identifying a first matching block of N by M pixels in the second image, the first matching block having a position that is displaced from the position of the first block in the first image within a predetermined range of displacements and that matches the first block according to a predetermined criterion;

calculating a first motion vector as the displacement of the pixel position of the first matching block of pixels from the second image relative to the position of the first block in the first image;

selecting a second block of N by M pixels from the first image, the second block overlapping the first block in at least O pixel positions, O being an integer less than N times M;

identifying a second matching block of N by M pixels in the second image, the second matching block having a position that is displaced from the position of the second block in the first image within the predetermined range of displacements and that matches the second block according to the predetermined criterion; and calculating a second motion vector as the displacement of the pixel position of the second matching block of pixels from the second image relative to the position of the second block in the first image.

14. A method for converting an interlaced video signal having first and second image fields, each having L lines of picture element (pixel) samples into a progressive video signal having corresponding first and second image frames, each having at least 2L-1 lines of pixel samples, by adding respective lines of interpolated pixel samples between each pair of lines of samples of the interlaced video signal, where L is an integer greater than one, the method comprising the steps of:

selecting first and second overlapping blocks of N by M pixels from the first image field, wherein the first and second blocks overlap by O pixels in a predetermined direction, M, N and O being integers and O being less than at least one of N and M;

estimating motion between the first and second image fields to define respective first and second motion vectors for the first and second overlapping blocks;

assigning the first and second motion vectors to respective first and second non-overlapping sub-blocks of pixels in the respective first and second blocks of pixel samples;

comparing a measure of difference between the first non-overlapping sub-block of pixels and a corresponding first matching sub-block from the second image, as determined by the first motion vector, to a predetermined threshold value to determine if the motion vector represents true motion between the first and second images;

generating the interpolated pixel samples using pixel samples in the first sub-block and the first matching sub-block if the motion vector represents true motion; and generating the interpolated pixel samples using pixel samples in the first sub-block only if the motion vector does not represent true motion.

* * * * *